R. D. CORKE.
TOOL.
APPLICATION FILED APR. 15, 1916.
1,237,021.
Patented Aug. 14, 1917.
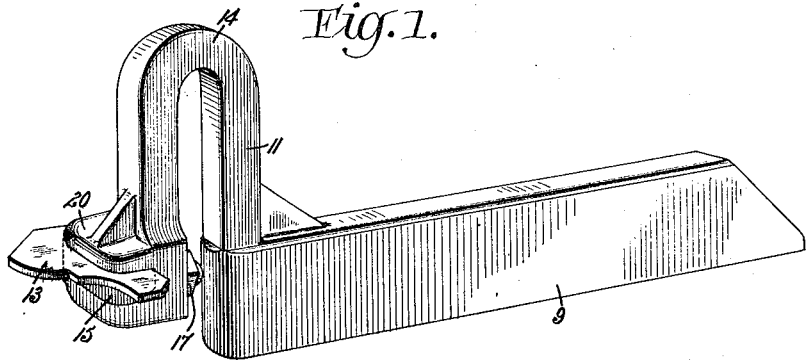
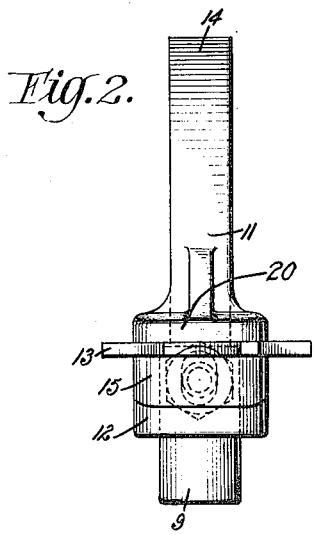
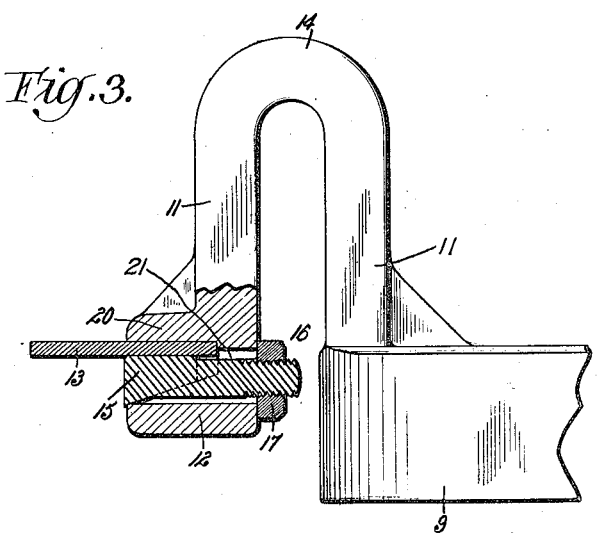
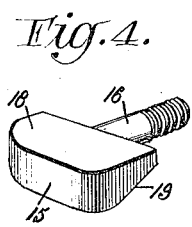
WITNESSES
Frederick Diehl.
INVENTOR
Rudolf D. Corke
BY
ATTORNEYS

UNITED STATES PATENT OFFICE.

RULOFF DEWITT CORKE, OF YONKERS, NEW YORK, ASSIGNOR OF ONE-FOURTH TO HENRY McEVOY, OF BROOKLYN, NEW YORK.

TOOL.

1,237,021.  Specification of Letters Patent.  Patented Aug. 14, 1917.

Application filed April 15, 1916. Serial No. 91,331.

*To all whom it may concern:*

Be it known that I, RULOFF D. CORKE, a citizen of the United States, and a resident of Yonkers, in the county of Westchester and State of New York, have invented a new and Improved Tool, of which the following is a full, clear, and exact description.

Among the principal objects which the present invention has in view are: to provide a machine tool having a series of cutting bits for disposition alternately in service; to provide a tool having a resilient body and replaceable rigid cutters therefor; to amplify the usefulness of a tool of the character indicated; and to simplify and cheapen the construction thereof.

Drawings.

Figure 1 is a perspective view of a tool constructed and arranged in accordance with the present invention;

Fig. 2 is an end view of the same shown on an enlarged scale;

Fig. 3 is a side view partly in section of an end fragment of the tool, the view being shown on an enlarged scale;

Fig. 4 is a detail view on an enlarged scale, and in perspective, of a chuck block used in connection with the present invention.

Description.

As seen in the drawings, the tool has a relatively heavy rigid body 9. The body 9 is shaped for insertion in the conventional tool holes of the usual tools, such as planers, shapers and lathes. The spring support 11 is U-shaped, and is provided at the free end with a socket head 12, wherein is disposed for service, cutters 13. The support 11 has two parallel legs connected by a curved portion 14. This portion may be specially tempered or reduced in section to localize the spring action of the support 11.

The cutters 13 are preferably formed of relatively thin bits of special metal, such as high-speed steel or steel formed with the various alloys, such as vanadium, tungsten, and molybdenum. As shown in Fig. 1 of the drawings, the edge of the cutters 13 is shaped to conform to a molding.

It will be understood that a number of cutters 13 having a variety of shapes may be constructed from the materials mentioned, and employed for insertion in the socket head 12. The socket head 12 is recessed to receive a wedge-shaped block 15. The block 15 has a shank extension 16, the end whereof is threaded to receive in service a nut 17. The block 15 has a clamping surface 18 and a wedging surface 19. The recess in the head 12 has a surface corresponding with the surface 19, so arranged that the block 15 is moved toward the jaw portion 20 of the head 12 when the nut 17 is turned up to draw down the shank extension 16.

The head 12 has a perforation 21 at the rear of the recess holding the block 15, to pass the shank 16 therethrough. The perforation 21 is elongated to permit the necessary movement of the shank 16 therein.

When supplied with a tool constructed and arranged in accordance with the present invention, the machinist may remove and replace the cutters 13 at will, by manipulating the nut 17 and block 15 in the recess provided therefor in the head 12.

It will be observed that during the operation of cutting, the support 11 will yield on the curved spring portion 14, to avoid chattering and also prevent breaking of the relatively brittle cutters 13.

Claim.

A tool comprising a rigid body; a gooseneck integrally formed therewith, the free end of said gooseneck being disposed in spaced relation to the end of said body; a jaw portion integrally connected with said gooseneck at the free terminal thereof, said jaw portion having a forwardly opening recess, the lower side of said recess being rearwardly and upwardly inclined and the upper side of said recess terminating with an abutment at the inner end of said jaw portion for preventing the displacement of a cutting tool held in said jaw portion; a wedge block shaped in correspondence with said recess; means for drawing said block into said recess, said means embodying a screw-threaded extension of said block, the end whereof protrudes into the space between the free end of said gooseneck and said body, and a nut engaging said screw-threaded extension for drawing said block within said recess.

RULOFF DEWITT CORKE.